Patented Dec. 18, 1934

1,984,511

UNITED STATES PATENT OFFICE 1,984,511

METHOD OF MAKING HYDROXYQUINONE COMPOUNDS

Rudolph J. Anderson and Melvin S. Newman, New Haven, Conn., assignors to The New Haven Dispensary, New Haven, Conn., a corporation of Connecticut No Drawing. Application September 9, 1933, Serial No. 688,823

14 Claims. (Cl. 260—56)

This invention relates to a hydroxyquinone and the method of making the same, and more particularly to a compound of this group having the formula $C_{11}H_8O_3$.

There occurs in the human tubercle bacillus a yellow crystalline pigment which we have isolated for the first time in pure form and have found to be of the above formula. Obtaining this substance from the human tubercle bacillus is a very expensive process, however, as it occurs in only small quantities.

Hydroxyquinones in general possess interesting chemical and physiological properties, and in view of the fact that chemical compounds produced by tubercle bacillus may be of importance in controlling or in alleviating tuberculosis, it has been deemed desirable to be able to produce such compounds by synthetic methods in order that they may be made available for experimental work. We have, therefore, devised a method of producing the substance above referred to by which it may be produced in quantity and at relatively small expense.

In the practice of our improved method we prefer to proceed in the following manner: A 2-methyl naphthalin is used as a starting material, and this 2-methyl naphthalin is oxidized with chromic acid in glacial acetic acid solution according to methods which are standard and which results in the formation of 2-methyl-1,4-naphthoquinone. The latter substance when crystallized from methyl alcohol is obtained as a lemon yellow crystalline product which has a melting point of approximately 104–106° centigrade. This same quinone has been prepared and described by Fries and Lohmann (Ber. 54, 2912 (1921)), and also by others.

From the 2-methyl-1,4-naphthoquinone thus obtained we prepare a diacetate of 2-methyl-1,4-hydroxy naphthalin. This latter substance is produced in the following manner. 10 parts of 2-methyl-1,4-naphthoquinone, 5 parts of fused sodium acetate, 10 parts of zinc dust, 25 parts of glacial acetic acid, and 100 parts of acetic anhydride are boiled under a reflux condenser for a period of approximately one half hour. It will be understood that the portions of the various substances mentioned above are those which are preferred, but we do not limit ourselves precisely to the amounts stated. The solution after it has been cooled to room temperature is decanted into cold water and the mixture is stirred until the acetic anhydride is decomposed. The diacetate which separates as a white solid is purified by crystallization from dilute methyl alcohol and is obtained in nearly quantitative yield in the form of colorless prismatic crystals which melt at approximately 114° centigrade. This same diacetate has been prepared previously by Fries and Lohmann and by others.

It is from this diacetate of 2-methyl-1,4-hydroxy naphthalin that we obtain the hydroxyquinone having the formula $C_{11}H_8O_3$. We have shown the chemical constitution of this substance probably to be 2-methyl-3-hydroxy-1,4-naphthoquinone, and to distinguish it we have given it the name phthiocol. In the reaction by which it is obtained from this diacetate, several by-products are formed so that the maximum yield of synthetic phthiocol is about 12% of the theoretical.

The product is obtained by treating this diacetate with alkali in alcoholic solution and is carried out in the following manner. 5 parts of the diacetate of 2-methyl-1,4-hydroxynaphthalin are dissolved in about 50 parts of absolute ethyl alcohol and the solution is mixed with 100 parts of absolute ethyl alcohol containing a small quantity of any of the well-known alkalis, for example, containing about 2% of sodium ethoxide. Potassium or barium hydroxide could be used as well. The solution, which turns intensely dark red in color, is allowed to stand at room temperature for a considerable period, approximately three hours, for example, after which it is diluted with water, acidified with a suitable acid such as hydrochloric acid or sulphuric acid and distilled with steam until the distillate is practically colorless. The distillate, which contains a yellow crystalline product, is extracted with ether. The ethereal extract is washed with water, after which it is shaken with a dilute hydroxide solution, such as a hydroxide solution of sodium or potassium. The alkaline solution turns deep red in color and contains thte alkali salt of the synthetic phthiocol, while the ethereal solution contains a neutral yellow crystalline compound.

This red alkaline solution is acidified and extracted with ether. The ethereal extract is washed with water, dried over sodium sulphate, and evaporated to dryness when a yellow crystalline residue consisting of crude or somewhat impure phthiocol is obtained. For purification the crude product is dissolved in warm methyl alcohol and the solution is diluted with water until it turns slightly cloudy. As the solution cools, light yellow prismatic crystals separate, which are filtered off, washed with cold dilute methyl alcohol, and dried. This is the pure product having the formula $C_{11}H_8O_3$, which we call phthiocol.

This substance is a yellow crystalline pigment which melts at approximately 173–174° centigrade, solidifies at 163° C., and remelts at 173–174° C. It will be understood, of course, that the proportions of the various substances used in the last reaction wherein the new substance is obtained from the diacetate of 2-methyl-1,4-hydroxynaphthalin are those which are preferred, but that departure may be made from the use of these exact proportions without departing from the spirit of the invention.

The steps involved in the manufacture of the substance $C_{11}H_8O_3$ are shown by the formulas below:

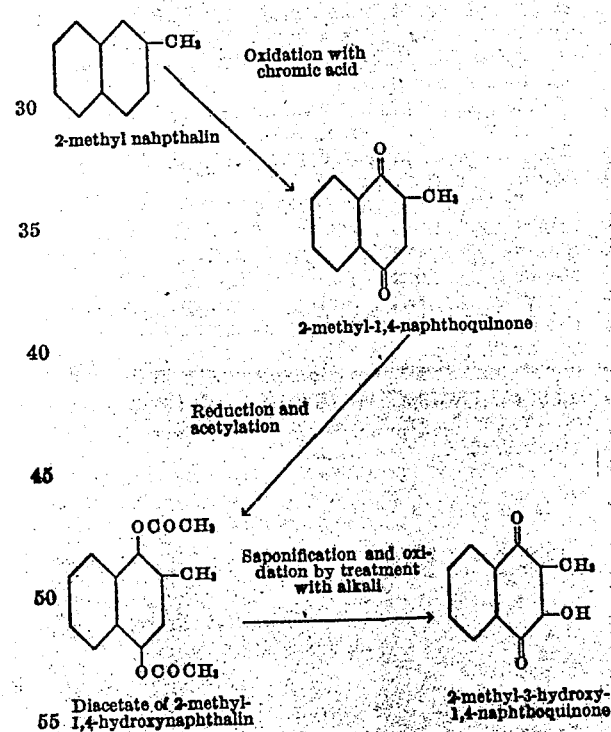

While we have described a preferred manner of carrying out our invention, it will be understood that various changes may be made in the details, and that considerable modification and variation may be made within the spirit of the invention and the scope of the appended claims.

What we claim is:

1. The method of making a hydroxyquinone compound which comprises the oxidation of 2-methyl naphthalin to form 2-methyl-1,4-naphthoquinone, and the introduction of a hydroxyl group in the 3-position of the 1,4-naphthoquinone ring by the use of an oxidizing process.

2. The method of making a hydroxyquinone compound which comprises oxidizing 2-methyl naphthalin with chromic acid to form 2-methyl-1,4-naphthoquinone, and the subsequent treatment of the 2-methyl-1,4-naphthoquinone to introduce a hydroxyl group in the 3-position, which includes the step of treatment with an oxidizing agent.

3. The method of making a hydroxyquinone having the formula $C_{11}H_8O_3$ which includes the step of the saponification and oxidation of diacetate of 2-methyl-1,4-hydroxynaphthalin by treatment with an alkali.

4. The method of making a hydroxyquinone having the formula $C_{11}H_8O_3$ which includes the step of the saponification and oxidation of diacetate of 2-methyl-1,4-hydroxynaphthalin by treatment with an alkali in alcoholic solution.

5. The method of making a hydroxyquinone compound which comprises the saponification and oxidation of the diacetate of 2-methyl-1,4-hydroxynaphthalin with an alkali in alcoholic solution.

6. The method of obtaining a substance having the formula $C_{11}H_8O_3$ from the diacetate of 2-methyl-1,4-hydroxynaphthalin which comprises dissolving the latter in ethyl alcohol, mixing the solution with ethyl alcohol containing an alkali, and acidifying and distilling the mixture thus obtained.

7. The method of making a hydroxyquinone compound which comprises preparing an alcoholic solution of the diacetate of 2-methyl-1,4-hydroxynaphthalin and mixing said solution with ethyl alcohol containing approximately 2% sodium ethoxide, distilling the solution thus obtained, and extracting the distillate with ether.

8. The method of making a hydroxyquinone compound which comprises preparing an alcoholic solution of the diacetate of 2-methyl-1,4-hydroxynaphthalin and mixing said solution with ethyl alcohol containing approximately 2% sodium ethoxide, acidifying and distilling the solution thus obtained, extracting the distillate with ether, treating the ethereal extract with a dilute hydroxide solution, and acidifying the alkaline solution thus obtained and extracting it with ether.

9. The method of making a hydroxyquinone probably of the formula which comprises the step of oxidizing a hydroxynaphthalin.

10. The method of making a hydroxyquinone probably of the formula which comprises the step of oxidizing a diacetate of a hydroxy-alkylnaphthalin.

11. The method of making a hydroxyquinone probably of the formula which comprises the step of oxidizing the diacetate of 2-methyl, 1-4 hydroxynaphthalin.

12. The method of making a hydroxyquinone probably of the formula

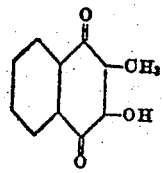

which comprises the alkalizing of a hydroxy-methylnaphthalin.

13. The method of making a hydroxyquinone probably of the formula

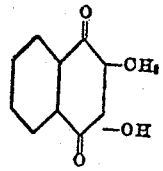

which comprises the alkalizing of a diacetate of a hydroxy-methylnaphthalin.

14. The method of making a hydroxyquinone compound which comprises the reduction of a naphthoquinone to form a hydroxynaphthalin and the subsequent oxidation of the hydroxynaphthalin.

RUDOLPH J. ANDERSON.
MELVIN S. NEWMAN.